(12) United States Patent
Clagg et al.

(10) Patent No.: US 9,679,163 B2
(45) Date of Patent: Jun. 13, 2017

(54) INSTALLATION AND MANAGEMENT OF CLIENT EXTENSIONS

(75) Inventors: Steven Michael Clagg, Seattle, WA (US); Oleg Ouliankine, Redmond, WA (US); Jason Todd Henderson, Tacoma, WA (US); David Claux, Redmond, WA (US); Andrew Salamatov, Seattle, WA (US); Yamin Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 13/351,310

(22) Filed: Jan. 17, 2012

(65) Prior Publication Data

US 2013/0185362 A1    Jul. 18, 2013

(51) Int. Cl.
*G06F 15/16* (2006.01)
*G06F 21/62* (2013.01)
(Continued)

(52) U.S. Cl.
CPC ............. *G06F 21/629* (2013.01); *G06F 8/61* (2013.01); *G06F 9/44526* (2013.01);
(Continued)

(58) Field of Classification Search
CPC ........... G06F 2221/2141; G06F 9/4443; G06F 9/44526; G06F 3/048; G06F 3/1293; G06F 8/38; G06F 21/604; G06F 15/167; G06F 17/30091; G06F 17/30126; G06F 17/30289; G06F 9/4451; G06F 3/0481; G06F 3/0482; G06F 21/629; G06F 8/61; G06F 67/10; G06F 63/102; H04L 63/20; H04L 63/10; H04L 67/10; H04L 63/0815; H04L 51/08; H04L 67/34; H04L 63/04; H04L 67/04; H04L 67/104; H04L 67/32; H04L 9/14; H04L 41/00; H04L 63/102; H04L 12/6418; H04L 41/0893; H04L 43/08; H04L 63/08; H04L 63/0807; H04L 63/104;
(Continued)

(56) References Cited

U.S. PATENT DOCUMENTS

| 5,349,658 A | 9/1994 | O'Rourke et al. |
| 5,877,757 A | 3/1999 | Baldwin et al. |

(Continued)

FOREIGN PATENT DOCUMENTS

| CN | 1747402 A | 3/2005 |
| CN | 1755680 A | 4/2006 |

(Continued)

OTHER PUBLICATIONS

"Gmail Contextual Gadgets Developer's Guide", Retrieved on: Oct. 17, 2011, Available at: http://code.google.com/apis/gmail/gadgets/contextual/.

(Continued)

*Primary Examiner* — Oleg Survillo (57) ABSTRACT

Application extension management may be provided. Upon logging into a user device by a user, a list of a plurality of extensions associated with the user may be retrieved from a central repository. Access to each of the plurality of extensions associated with the user on the user device may then be provided to the user device.

20 Claims, 3 Drawing Sheets

(51) Int. Cl.
*G06F 9/445* (2006.01)
*G06F 3/0482* (2013.01)
*G06F 3/0481* (2013.01)
*H04L 12/58* (2006.01)
*H04L 29/06* (2006.01)

(52) U.S. Cl.
CPC .......... *G06F 3/0481* (2013.01); *G06F 3/0482* (2013.01); *G06F 9/4451* (2013.01); *H04L 51/046* (2013.01); *H04L 63/104* (2013.01)

(58) Field of Classification Search
CPC ... H04L 63/123; H04L 67/1097; H04L 67/16; H04L 9/0662; H04L 51/046
USPC ....... 709/206, 207, 221, 225, 223, 204, 226, 709/217, 201, 205, 230, 232, 215; 726/27, 1; 707/E17.005, 785, 999.009
See application file for complete search history.

(56) References Cited

U.S. PATENT DOCUMENTS

| | | | |
|---|---|---|---|
| 5,986,657 A | 11/1999 | Berteig et al. | |
| 6,014,666 A * | 1/2000 | Helland et al. | |
| 6,292,889 B1 * | 9/2001 | Fitzgerald et al. | 713/1 |
| 6,408,336 B1 * | 6/2002 | Schneider et al. | 709/229 |
| 6,449,643 B1 * | 9/2002 | Hyndman et al. | 709/223 |
| 6,530,075 B1 | 3/2003 | Beadle et al. | |
| 6,697,942 B1 * | 2/2004 | L'Heureux et al. | 713/152 |
| 6,754,896 B2 | 6/2004 | Mishra et al. | |
| 6,785,867 B2 | 8/2004 | Shaffer et al. | |
| 7,000,230 B1 | 2/2006 | Murray et al. | |
| 7,136,843 B2 | 11/2006 | Bigus et al. | |
| 7,219,234 B1 * | 5/2007 | Ashland et al. | 713/182 |
| 7,233,792 B2 | 6/2007 | Chang | |
| 7,243,336 B2 | 7/2007 | Brockway et al. | |
| 7,284,191 B2 | 10/2007 | Grefenstette et al. | |
| 7,333,956 B2 | 2/2008 | Malcolm | |
| 7,360,167 B2 | 4/2008 | Hennum et al. | |
| 7,506,263 B1 | 3/2009 | Johnston et al. | |
| 7,529,804 B1 | 5/2009 | Lu et al. | |
| 7,707,257 B2 | 4/2010 | Taieb et al. | |
| 7,765,212 B2 | 7/2010 | Surendran et al. | |
| 7,779,027 B2 * | 8/2010 | James et al. | 707/769 |
| 7,861,167 B2 | 12/2010 | Fernando et al. | |
| 7,912,822 B2 | 3/2011 | Bethlehem et al. | |
| 8,010,613 B2 | 8/2011 | Oral et al. | |
| 8,024,412 B2 | 9/2011 | McCann et al. | |
| 8,074,217 B2 | 12/2011 | James et al. | |
| 8,220,007 B1 | 7/2012 | Yeh et al. | |
| 8,250,518 B2 | 8/2012 | Averett et al. | |
| 8,255,280 B1 * | 8/2012 | Kay et al. | 705/26.1 |
| 8,275,356 B2 * | 9/2012 | Hickie | 455/410 |
| 8,429,286 B2 * | 4/2013 | Pantos | 709/231 |
| 8,578,507 B2 * | 11/2013 | Faitelson et al. | 726/28 |
| 8,826,455 B2 * | 9/2014 | Julisch et al. | 726/28 |
| 8,843,822 B2 | 9/2014 | Claux et al. | |
| 8,959,425 B2 | 2/2015 | Ouliankine et al. | |
| 9,256,445 B2 | 2/2016 | Claux et al. | |
| 2002/0059347 A1 | 5/2002 | Shaffer et al. | |
| 2002/0078091 A1 | 6/2002 | Vu et al. | |
| 2002/0103824 A1 | 8/2002 | Koppolu et al. | |
| 2002/0171671 A1 | 11/2002 | Bou et al. | |
| 2003/0126592 A1 * | 7/2003 | Mishra et al. | 717/176 |
| 2003/0196172 A1 | 10/2003 | Bates et al. | |
| 2003/0236875 A1 | 12/2003 | Green et al. | |
| 2004/0003389 A1 | 1/2004 | Reynar et al. | |
| 2004/0034860 A1 | 2/2004 | Fernando et al. | |
| 2004/0059813 A1 | 3/2004 | Bolder et al. | |
| 2004/0117799 A1 | 6/2004 | Brockway et al. | |
| 2004/0119745 A1 | 6/2004 | Bartek et al. | |
| 2005/0033728 A1 | 2/2005 | James et al. | |
| 2005/0044046 A1 * | 2/2005 | Ishiguro | G06F 21/10 705/57 |
| 2005/0091184 A1 | 4/2005 | Seshadri et al. | |
| 2005/0119967 A1 * | 6/2005 | Ishiguro | G06F 21/10 705/38 |
| 2005/0144000 A1 | 6/2005 | Yamasaki et al. | |
| 2005/0144318 A1 | 6/2005 | Chang | |
| 2005/0188174 A1 | 8/2005 | Guzak et al. | |
| 2005/0229104 A1 * | 10/2005 | Franco et al. | 715/743 |
| 2005/0289113 A1 | 12/2005 | Bookstaff | |
| 2005/0289535 A1 | 12/2005 | Murray et al. | |
| 2006/0004739 A1 | 1/2006 | Anthony et al. | |
| 2006/0036725 A1 * | 2/2006 | Chand | 709/223 |
| 2006/0036965 A1 | 2/2006 | Harris et al. | |
| 2006/0069836 A1 | 3/2006 | Seo et al. | |
| 2006/0101053 A1 | 5/2006 | Proctor | |
| 2006/0155812 A1 * | 7/2006 | Looman | 709/206 |
| 2006/0168136 A1 | 7/2006 | Bethlehem et al. | |
| 2006/0173859 A1 | 8/2006 | Kim et al. | |
| 2006/0195575 A1 * | 8/2006 | Delany et al. | 709/225 |
| 2006/0218488 A1 | 9/2006 | Shah et al. | |
| 2007/0061401 A1 | 3/2007 | Bodin et al. | |
| 2007/0073699 A1 * | 3/2007 | Reed | G06F 21/604 |
| 2007/0094408 A1 | 4/2007 | Gundla et al. | |
| 2007/0124696 A1 | 5/2007 | Mullender et al. | |
| 2007/0136603 A1 * | 6/2007 | Kuecuekyan | 713/185 |
| 2007/0156897 A1 * | 7/2007 | Lim | 709/225 |
| 2007/0156913 A1 | 7/2007 | Miyamoto et al. | |
| 2007/0226204 A1 | 9/2007 | Feldman | |
| 2007/0233791 A1 | 10/2007 | Sylthe et al. | |
| 2007/0240098 A1 | 10/2007 | Averett et al. | |
| 2007/0244987 A1 * | 10/2007 | Pedersen et al. | 709/217 |
| 2007/0261066 A1 | 11/2007 | Miyamoto et al. | |
| 2008/0033955 A1 * | 2/2008 | Fujii | G06F 21/6218 |
| 2008/0059463 A1 | 3/2008 | Bauchot et al. | |
| 2008/0082907 A1 | 4/2008 | Sorotokin | |
| 2008/0109448 A1 | 5/2008 | Aboel-Nil et al. | |
| 2008/0109912 A1 * | 5/2008 | Rivera | H04L 63/20 726/30 |
| 2008/0134162 A1 | 6/2008 | James et al. | |
| 2008/0155555 A1 | 6/2008 | Kwong | |
| 2008/0189360 A1 | 8/2008 | Kiley et al. | |
| 2008/0244440 A1 | 10/2008 | Bailey et al. | |
| 2008/0244443 A1 | 10/2008 | Schaw et al. | |
| 2008/0250097 A1 | 10/2008 | Angelini et al. | |
| 2008/0271157 A1 * | 10/2008 | Faitelson et al. | 726/27 |
| 2008/0294730 A1 | 11/2008 | Oral et al. | |
| 2008/0307046 A1 | 12/2008 | Baek et al. | |
| 2009/0006201 A1 | 1/2009 | Faseler, Jr. | |
| 2009/0044146 A1 | 2/2009 | Patel et al. | |
| 2009/0094332 A1 * | 4/2009 | Schemers et al. | 709/206 |
| 2009/0150981 A1 * | 6/2009 | Amies et al. | 726/5 |
| 2009/0164427 A1 | 6/2009 | Shields et al. | |
| 2009/0193444 A1 | 7/2009 | Clark et al. | |
| 2009/0210800 A1 | 8/2009 | McCann et al. | |
| 2009/0265139 A1 | 10/2009 | Klein et al. | |
| 2009/0265330 A1 | 10/2009 | Cheng et al. | |
| 2009/0293135 A1 * | 11/2009 | Nanaumi | G06F 21/6218 726/28 |
| 2009/0300597 A1 | 12/2009 | George et al. | |
| 2009/0307652 A1 | 12/2009 | Maybee et al. | |
| 2009/0313554 A1 | 12/2009 | Haynes et al. | |
| 2009/0319911 A1 | 12/2009 | McCann et al. | |
| 2009/0327352 A1 * | 12/2009 | Thomas et al. | 707/200 |
| 2010/0011352 A1 | 1/2010 | Chu et al. | |
| 2010/0081417 A1 | 4/2010 | Hickie | |
| 2010/0131529 A1 | 5/2010 | Kasera et al. | |
| 2010/0153915 A1 | 6/2010 | Schneider | |
| 2010/0211989 A1 | 8/2010 | Julisch et al. | |
| 2010/0241604 A1 | 9/2010 | Kamani et al. | |
| 2010/0257182 A1 | 10/2010 | Saliba et al. | |
| 2010/0262557 A1 | 10/2010 | Ferreira et al. | |
| 2010/0287525 A1 | 11/2010 | Wagner | |
| 2010/0293586 A1 | 11/2010 | Rodrigues et al. | |
| 2010/0318642 A1 * | 12/2010 | Dozier | H04L 12/66 709/223 |
| 2011/0028138 A1 | 2/2011 | Moore et al. | |
| 2011/0029988 A1 | 2/2011 | Mittal et al. | |
| 2011/0072352 A1 | 3/2011 | Tanner et al. | |
| 2011/0087984 A1 | 4/2011 | Jitkoff et al. | |
| 2011/0093801 A1 * | 4/2011 | Koyama et al. | 715/763 |
| 2011/0106736 A1 | 5/2011 | Aharonson et al. | |

(56) References Cited

U.S. PATENT DOCUMENTS

| | | | |
|---|---|---|---|
| 2011/0113450 | A1 | 5/2011 | Sharma et al. |
| 2011/0126296 | A1* | 5/2011 | Moore .............. H04L 63/0807 726/28 |
| 2011/0145749 | A1 | 6/2011 | Sailor et al. |
| 2011/0154312 | A1 | 6/2011 | Balko et al. |
| 2011/0209159 | A1 | 8/2011 | Baratz et al. |
| 2011/0289056 | A1 | 11/2011 | Xue et al. |
| 2012/0005155 | A1 | 1/2012 | Lynch et al. |
| 2012/0023421 | A1 | 1/2012 | Demant et al. |
| 2012/0084644 | A1 | 4/2012 | Robert et al. |
| 2012/0089699 | A1* | 4/2012 | Cholas .............. H04L 12/2812 709/217 |
| 2012/0094719 | A1 | 4/2012 | Choi et al. |
| 2012/0144282 | A1 | 6/2012 | Loeb et al. |
| 2013/0076598 | A1 | 3/2013 | Sirpal et al. |
| 2013/0151942 | A1 | 6/2013 | Ouliankine et al. |
| 2013/0198623 | A1 | 8/2013 | Claux et al. |
| 2013/0198627 | A1 | 8/2013 | Claux et al. |
| 2013/0198647 | A1 | 8/2013 | Claux et al. |
| 2016/0085395 | A1 | 3/2016 | Claux et al. |
| 2016/0349950 | A1 | 12/2016 | Claux et al. |

FOREIGN PATENT DOCUMENTS

| | | |
|---|---|---|
| CN | 1828529 A | 9/2006 |
| CN | 101005368 A | 7/2007 |
| CN | 101315624 A | 12/2008 |
| CN | 101317150 | 12/2008 |
| CN | 101317150 A | 12/2008 |
| CN | 101606155 A | 12/2009 |
| CN | 102141997 A | 8/2011 |
| JP | 2010-204743 | 9/2010 |
| JP | 2011-0066101 | 3/2011 |
| TW | 201118742 A | 6/2011 |

OTHER PUBLICATIONS

"Manage Windows and Panels", Retrieved on: Oct. 10, 2011, Available at: http://help.adobe.com/en_US/InDesign/6.0/WS8599BC5C-3E44-406c-9288-C3B3BBEB5E88.html.

"Spam Filter", Retrieved on: Sep. 26, 2011, Available at: http://www.esoft.com/network-security-appliances/add-ons/spamfilter/.

"Thunderbird Email Thread Visualizer", Published on: Oct. 11, 2011, Available at: http://www.ghacks.net/2009/08/13/thunderbird-email-thread-visualizer/.

"Window Layout—Thunderbird", Retrieved on: Oct. 7, 2011, Available at: http://kb.mozillazine.org/Windowlayout_-_Thunderbird.

Aery, et al., "eMailSift: Email Classification Based on Structure and Content", In Proceedings of the Fifth IEEE International Conference on Data Mining, Nov. 27-30, 2005, pp. 18-25.

Bekkerman, et al., "Automatic Categorization of Email into Folders: Benchmark Experiments on Enron and SRI Corpora", In CIIR Technical Report IR-418, University of Massachusetts, 2004, pp. 1-23.

Bykov, Vassili, "Hopscotch: Towards User Interface Composition", In Proceedings of International Workshop on Advanced Software Development Tools and Techniques, Jul. 2008, 9 pages.

Dejean, et al., "What's new in IBM Lotus Notes and Domino V8", Published on: Mar. 20, 2007, Available at: http://www.ibm.com/developerworks/lotus/library/notes8-new/.

International Search Report and Written Opinion for PCT/US2012/066691 mailed Feb. 28, 2013.

Majid, et al., "NaCIN—An Eclipse Plug-In for Program Navigation-based Concern Inference", In Proceedings of the OOPSLA Workshop on Eclipse Technology eXchange, Oct. 16, 2005, pp. 70-74.

Nedos, et al., "LATTE: Location and Time Triggered Email", In Proceedings of the International Conference on Pervasive Computing and Communications, Jun. 21-24, 2004, pp. 813-819.

Rohall, et al., "Email Visualizations to Aid Communications", In Proceedings of Late-Breaking Hot Topics, IEEE Symposium on Information Visualization, Oct. 2011, pp. 12-15.

U.S. Non-Final Office Action for U.S. Appl. No. 13/315,314 mailed Mar. 15, 2013.

U.S. Appl. No. 13/315,314, filed Dec. 9, 2011, entitled "Inference-Based Extension Activation".

U.S. Appl. No. 13/361,097, filed Jan. 30, 2012, entitled "Extension Activation for Related Documents".

U.S. Appl. No. 13/361,140, filed Jan. 30, 2012, entitled "Dynamic Extension View With Multiple Levels of Expansion".

U.S. Appl. No. 13/361,219, filed Jan. 30, 2012, entitled "Intelligent Prioritization of Activated Extensions".

International Search Report and Written Opinion for PCT/US2013/020915 mailed Apr. 23, 2013, 10 pgs.

International Search Report and Written Opinion for PCT/US2013/022823 mailed May 10, 2013, 10 pgs.

International Search Report and Written Opinion for PCT/US2013/022826 mailed May 10, 2013, 11 pgs.

International Search Report and Written Opinion for PCT/US2013/022615 mailed May 16, 2013, 9 pgs.

"RSEMCE_235677.EXE—Remote Storage for Exchange v2.0 Mail Client Extension Install", Retrieved on: Oct. 10, 2011, Available at: http://www.symantec.com/business/support/index?page=content&pmv=print&impressions=&viewlocale=&id=TECH10485.

"Glovia G2 Web Client—Full Windows Graphical user Interface Client within any Browser Supporting ActiveX" Retrieved on: Oct. 10, 2011, Available at: http://www.glovia.com/pdf/datasheets/GloviaWebClient.pdf.

"Changes in Outlook 2010", Retrieved on: Oct. 10, 2011, Available at: http://technet.microsoft.com/en-us/library/cc179110.aspx.

"Extension Plug-ins for Processing Messages", Retrieved on: Oct. 10, 2011, Available at: http://docs.blackberry.com/en/admin/deliverables/25767/Ext_plugins_for_processing_msgs_595319_11.jsp.

"Installing Content Collector Notes Client Extension in Silent Mode", Retrieved on: Oct. 10, 2011, Available at: http://publib.boulder.ibm.com/infocenter/email/v2r2m0/index.jsp?topic=%2Fcom.ibm.content.collector.doc%2Finstalling%2Ft_afu_install_nce_silent.htm.

Chinese First Office Action and Search Report Issued in Patent Application No. 201380007344.9, Mailed Date: Jun. 24, 2016, 14 Pages. (with translation).

Chinese Second Office Action dated Jun. 2, 2016 cited in Application No. 201310017749.2, 14 pgs. (with translation).

U.S. Appl. No. 13/361,097, Notice of allowance dated May 9, 2016, 22 pgs.

Chinese Notice on Grant dated Jan. 13, 2016 cited in Application No. 201210520996.X, 6 pgs.

European Office Action dated Mar. 22, 2016 in Application No. 13742862.9, 5 pgs.

U.S. Appl. No. 13/361,097, Office Action dated Dec. 31, 2015, 44 pgs.

Adams; "Getting Started with Gmail Contextual Gadgets"; DJ's Weblog; Jun. 21, 2010; 8 pgs. (cited in Jun. 10, 2015 EP Comm).

Cornell; "Developing Smart Tag DLLs"; Apr. 2001; Retrieved from: http://msdn.microsoft.com/library/default.asp?url=/library.en-us/dnsmarttag/html; 8 pgs. (cited in Jun. 10, 2015 EP Comm).

EP Communication dated Jun. 10, 2015 cited in Appln No. PCT/US2012/066691, 10 pgs.

EP Supplementary Search Report Received in European Patent Application No. 13743289.4, Mailed Date: Jul. 10, 2015, 7 Pages.

Chinese First Office Action Issued in Patent Application No. 201380007338.3, Mailed Date: Sep. 23, 2016, 10 Pages. (with translation).

Chinese Notice of Allowance dated Sep. 5, 2016 cited in Application No. 201310017749.2, 4 pgs. (with translation).

Japanese Office Action in Application 2014555578, mailed Oct. 18, 2016, 8 pages.

U.S. Office Action dated Apr. 23, 2015 cited in U.S. Appl. No. 13/361,140, 28 pgs.

(56) References Cited

OTHER PUBLICATIONS

U.S. Office Action dated May 7, 2015 cited in U.S. Appl. No. 13/361,097, 31 pgs.
Chinese First Office Action dated Mar. 25, 2015 cited in Application No. 201210520996.X, 14 pgs. (w/translation).
U.S. Office Action dated Jul. 16, 2013 cited in U.S. Appl. No. 13/361,140, 22 pgs.
U.S. Final Office Action dated Sep. 6, 2013 cited in U.S. Appl. No. 13/315,314, 26 pgs.
U.S. Office Action dated Sep. 10, 2013 cited in U.S. Appl. 13/361,219, 33 pgs.
U.S. Office Action dated Dec. 19, 2013 cited in U.S. Appl. 13/315,314, 21 pgs.
U.S. Office Action dated Jan. 14, 2014 cited in U.S. Appl. 13/361,097, 18 pgs.
U.S. Final Office Action dated Feb. 19, 2014 cited in U.S. Appl. 13/361,140, 32 pgs.
U.S. Final Office Action dated Mar. 3, 2014 cited in U.S. Appl. 13/361,219, 22 pgs.
U.S. Final Office Action dated Jun. 4, 2014 cited in U.S. Appl. 13/361,097, 27 pgs.
U.S. Final Office Action dated Jun. 17, 2014 cited in U.S. Appl. 13/315,314, 19 pgs.
U.S. Office Action dated Oct. 6, 2014 cited in U.S. Appl. 13/361,140, 35 pgs.
U.S. Office Action dated Dec. 22, 2014 cited in U.S. Appl. 13/361,097, 31 pgs.
EP Extended Search Report Received in European Patent Application No. 13742862.9, Mailed Date: Aug. 14, 2015, 8 Pages.
EP Extended Search Report Received in European Patent Application No. 13744376.8, Mailed Date: Sep. 1, 2015, 9 Pages.
Chinese First Office Action dated Sep. 29, 2015 cited in Application No. 201310017749.2, 13 pgs. (w/translation).
Notice of Allowance dated Sep. 16, 2015 in U.S. Appl. No. 13/361,140, 5 pgs.
Chinese Office Action in Application 201380007344.9, mailed Jan. 11, 2017, 15 pages.
European Communication in Application 12854863.3, mailed Mar. 9, 2017, 8 pages.
Japanese Notice of Allowance in Application 2014555578, mailed Feb. 28, 2017, 3 pages. (No English Translation).
European Communication in Application 13644376.8, mailed Mar. 28, 2017, 6 pages.
Japanese Office Action in Application 2014555578, mailed Jan. 5, 2017, 4 pages.

* cited by examiner

INSTALLATION AND MANAGEMENT OF CLIENT EXTENSIONS

BACKGROUND

Client extension management may be provided. In conventional systems, client application extensions are installed and managed on a per user and/or per desktop basis. For managed environments, this does not scale well as it requires administrators to install and manage extensions per user individually. Some software distribution solutions may push out installations for each user. In some situations, this technique may be prone to error and may suffer from poor performance on large scales. Furthermore, Information Technology (IT) management may want to ensure that a group of users always have a given client add-on installed and running. As employees join and leave that group, however, typical per user management may result in different versions running for different members of that group.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Application extension management may be provided. Upon logging into a user device by a user, a list of a plurality of extensions associated with the user may be retrieved from a central repository. Access to each of the plurality of extensions associated with the user on the user device may then be provided to the user device.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

A management interface may provide administrators with the ability to select extensions, such as through a marketplace style interface, which may be installed on a user, group, departmental, and/or organization-wide basis. The interface may further provide the administrator with additional options, such as configuring whether an extension should be mandatory or optional for users, uninstalling the extension, and/or checking for updates from extension provider sources.

A central repository may list extensions installed for users within an organization. This way, administrators do not have to manage installations for individual users, but may install the extensions to one central location in the organization that may then be accessed by all and/or selected users within the organization. Changes to the organization's installation may immediately be recognized and consumed by all users, without any additional per user provisioning or installation steps. A manifest for each extension may be stored in the repository, which may comprise an organizational mailbox. The manifest may comprise meta-data about the organizational configuration for each extension, such as whether the extension is enabled or disabled, which users are allowed to access the extension, whether operation of the extension is mandatory or optional, etc.

Administrators may be able to identify which extensions may be provided to a particular group or department within the organization, and ensure that users are provided with an approved extension. The may also allow administrators to reliably limit to whom the acquired extension is provided as well as allowing enforcement of policies that require particular extensions to be executed. Such mandatory extensions may execute on targeted users' devices without input from the users, while optional extensions may be enabled and/or disabled by individual users.

An end-user management interface may retrieve a list of extensions to load from the central organization repository, which may be filtered to only those that are enabled and/or provided to the given user. Any end-user specific configurations may be loaded from a mailbox within the repository associated with the user.

Figure 1:
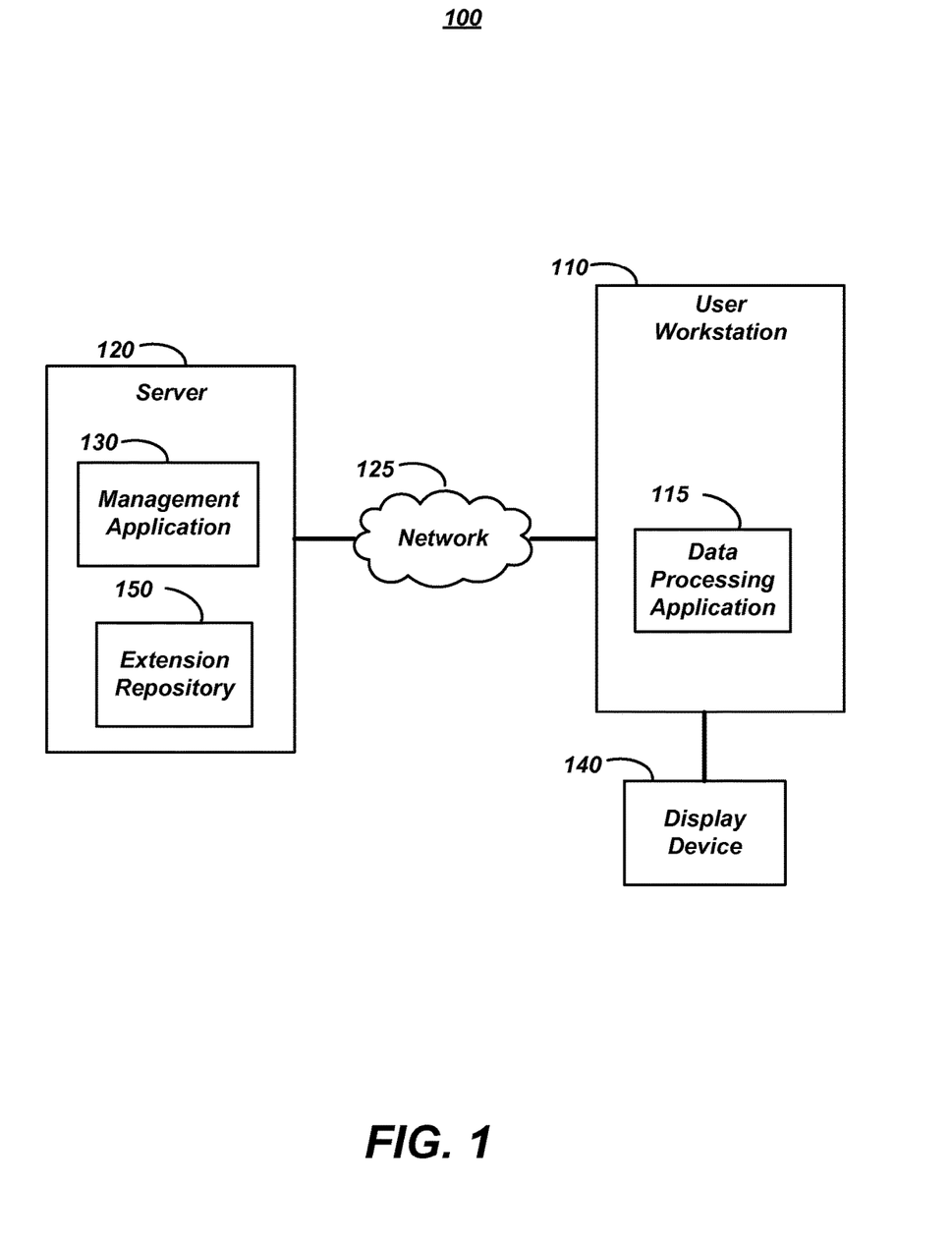
FIG. 1 is a block diagram of an operating environment.

FIG. 1 is a block diagram of an operating environment 100 for providing extension management comprising a user device 110. User device 110 may comprise a data processing application 115 and may be operative to interact with a server 120 via a network 125. Server 120 may be operative to execute a plurality of applications and/or services, such as an extension management application 130. Data processing application 115 may comprise, for example, a word processing, spreadsheet, presentation, web browser, e-mail and/or other application. User device 110 may be operative to output application data and/or user interfaces to a display device 140, such as a monitor and/or touchscreen. User device 110 may comprise, for example, an electronic communications device such as a computer, laptop, cellular and/or IP phone, tablet, game console and/or other device. Data processing application 115 may be operative to communicate with server 120 and receive provisioned access to a plurality of extensions as configured in an extension repository 150. Extension management application 130 may be operative to provide information technology (IT) administrators with a centralized interface for managing extension settings and access permissions on a per-user, user group, and/or organization wide basis.

Figure 2:
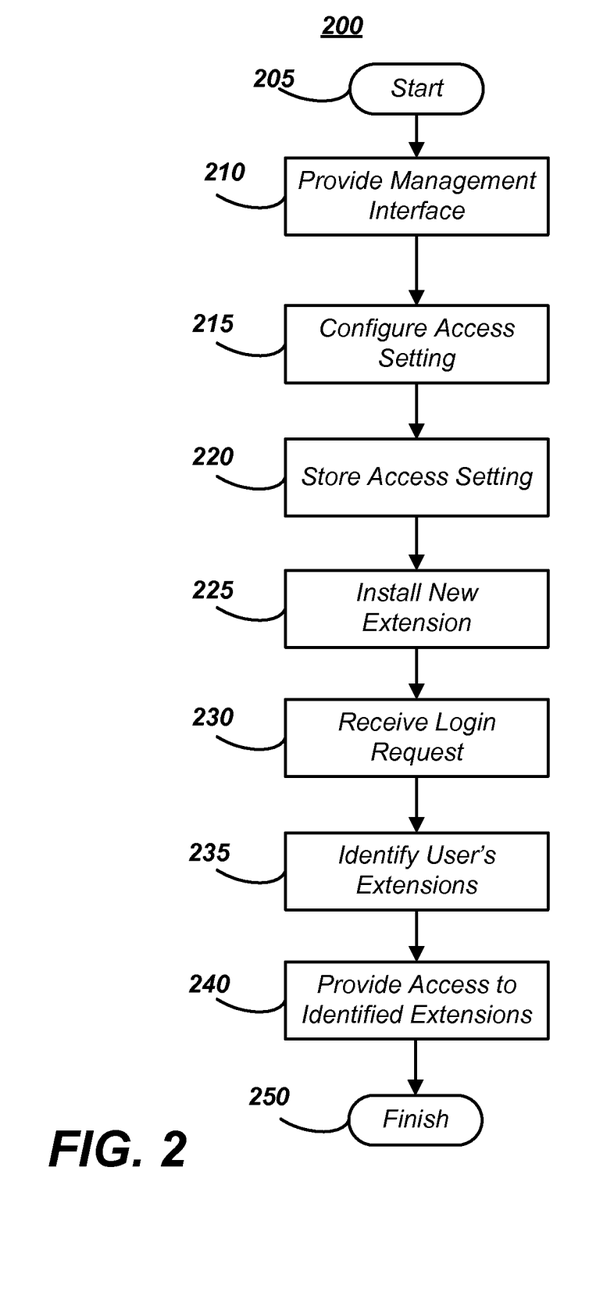
FIG. 2 is a flow chart of a method for providing extension management.

FIG. 2 is a flow chart setting forth the general stages involved in a method 200 consistent with an embodiment of the invention for providing application extension management. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may provide an extension management interface. For example, the extension management interface may be integrated into an e-mail application wherein each of a plurality of mailboxes and/or mail folders may be associated with one of a plurality of application extensions. Manifests comprising configuration information for the extensions may be stored in the mail structure, such as in a plurality of messages associated with the mailbox and/or folder.

Method 200 may then advance to stage 215 where computing device 300 may configure an access setting for at least one of the plurality of application extensions. For example, some extensions may be configured as mandatory for an individual user, a group of users, and/or all users associated with an organization. A given extension may comprise different access settings for different users, such as where a software development bug list extension may be mandatory for users in a quality assurance user group, optional for users in a management user group, and prohibited for users in an accounting user group. Other configuration options may also be modified, such as display settings, external data sources, access to user-configurable options, extension metadata, etc.

Method 200 may then advance to stage 220 where computing device 300 may store the access setting for the application extension in a manifest. For example, the manifest may be stored in a mailbox associated with the application extensions. The manifest may comprise other configuration details, such as login information for the extension, window and/or user interface placement settings, etc.

Method 200 may then advance to stage 225 where computing device 300 may install a new application extension via the extension management interface. For example, an administrator may select a new application extension from a list of available extensions such as an app store and/or marketplace. A new mailbox/folder may be created within the extension management interface for the new extension and a new manifest comprising configured access settings for the new extension may be created. Consistent with embodiments of the invention, users who are configured with access to the new extension may be notified of the extension's availability and/or the extension may be provided automatically to such users.

Method 200 may then advance to stage 230 where computing device 300 may receive a login request from at least one user on a remote device. For example, a user may log in to device 110, which may transmit an authentication request to server 120 over network 125.

Method 200 may then advance to stage 235 where computing device 300 may identify at least a subset of the plurality of application extensions associated with the at least one user. For example, server 120 may scan the manifests created and managed by extension management application 130 to identify those application extensions to which the user logging in has received access. Such access may be mandatory, where the user may not disable the extension, or optional, where the user may enable or disable the extension per their preference.

Method 200 may then advance to stage 240 where computing device 300 may provide access to each of the subset of the plurality of application extensions to the remote device. For example, mandatory and/or optionally enabled extensions for the user may be displayed on display device 140. Such extensions may execute locally on user device 110 and/or may be accessed via a network reference and execute remotely, such as on server 120 and/or another computing device connected to network 125, such as a web server. Method 200 may then end at stage 250

An embodiment consistent with the invention may comprise a system for providing application extension management. The system may comprise a memory storage and a processing unit coupled to the memory storage. The processing unit may be operative to receive a login to a device from a user, retrieve a list of a plurality of extensions associated with the user from a central repository, and provide access to each of the plurality of extensions associated with the user on the device.

Another embodiment consistent with the invention may comprise a system for providing application extension management. The system may comprise a memory storage and a processing unit coupled to the memory storage. The processing unit may be operative to install a plurality of application extensions to a central repository, receive a login request from a user of a device, identify at least a subset of the plurality of application extensions associated with the user, and provide access to at least the subset of the plurality of application extensions to the user's device. The processing may be further operative to receive a selection of at least one application extension of the plurality of application extensions via an extension management interface, identify a plurality of users associated with the selected at least one application extension, and display a status of each of the plurality of users associated with the selected at least one application extension. For example, the extension management interface may show all users that have the selected extension enabled/disabled and/or whether the extension is actively in use by those users.

Yet another embodiment consistent with the invention may comprise a system for providing application extension management. The system may comprise a memory storage and a processing unit coupled to the memory storage. The processing unit may be operative to provide an extension management interface via an e-mail application that displays a plurality of mailboxes each associated with one of a plurality of application extensions, configure an access setting for at least one of the plurality of application extensions for an individual user, a group of users, and/or all users associated with an organization, store the access setting for the at least one of the plurality of application extensions in a manifest in a one of the plurality of mailboxes associated with the at least one of the plurality of application extensions, and install a new application extension via the extension management interface. The processing unit may be further operative to receive a login request from at least one user on a remote user device, identify at least a subset of the plurality of application extensions associated with the at least one user wherein at least one first extension of the subset of the plurality of application extensions comprises a mandatory access setting on and at least one second extension of the subset of the plurality of application extensions comprises an optional access setting, and provide access to each of the subset of the plurality of application extensions to the remote user device.

Figure 3:
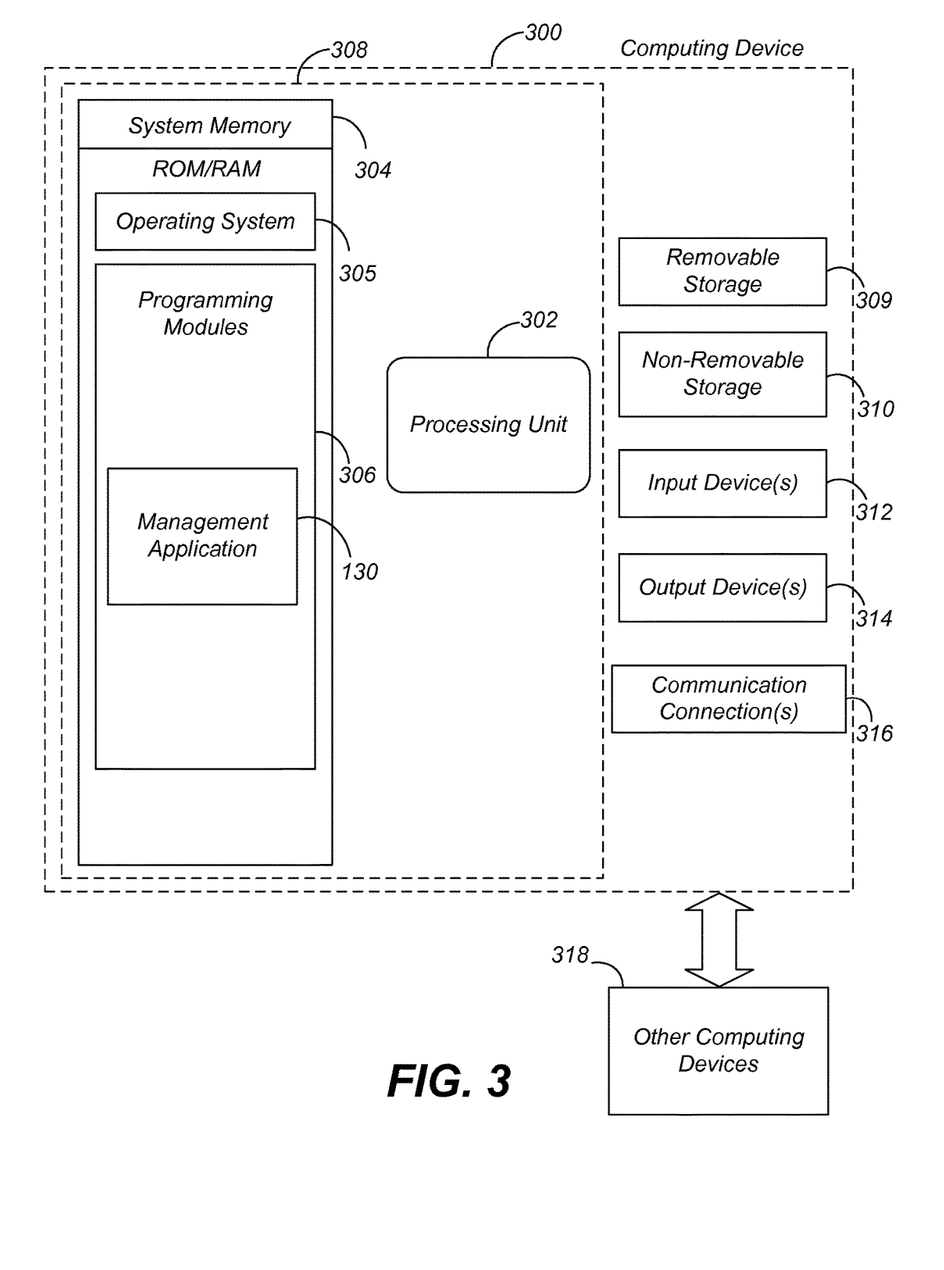
FIG. 3 is a block diagram of a computing device.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 3 and the associated descriptions provide a discussion of a variety of operating environments in which embodiments of the invention may be practiced. However, the devices and systems illustrated and discussed with respect to FIG. 3 are for purposes of example and illustration and are not limiting of a vast number of computing device configurations that may be utilized for practicing embodiments of the invention, described herein.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include extension management application 130. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, a capture device, etc. A capture device may be operative to record a user and capture spoken words, motions and/or gestures made by the user, such as with a camera and/or microphone. The capture device may comprise any speech and/or motion detection device capable of detecting the speech and/or actions of the user. For example, the capture device may comprise a Microsoft® Kinect® motion capture device comprising a plurality of cameras and a plurality of microphones. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 may perform processes and/or methods as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each and/or many of the components illustrated above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any component of operating environment 100 may operate via application-specific logic integrated with other components of the computing device/system on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method implemented in a computing environment for providing application extension management, the method comprising:
   installing a plurality of application extensions in a central repository;
   providing, by an extension management application, an extension management interface configured for:
      identifying a plurality of users associated with the plurality of application extensions;
      displaying a usage status of each of the plurality of users associated with the plurality of application extensions, the usage status identifying one or more of:
   enabled, disabled, and actively in use;
      configuring a usage policy for the plurality of application extensions, wherein the usage policy is based at least in part on the usage status of each of the plurality of users, and wherein the usage status indicates whether the at least one application extension is actively in use by at least one of the plurality of users;
   based at least in part on the usage policy and a usage status of the at least one of the plurality of users, receiving a selection of at least one application extension of the plurality of application extensions for access by the at least one user;
   providing access to the at least one selected application extension via the extension management interface on a device of the at least one user;
   identifying at least a subset of the plurality of application extensions associated with the at least one user, wherein at least one first extension of the subset of the plurality of application extensions comprises a mandatory access setting and at least one second extension of the subset of the plurality of application extensions comprises an optional access setting; and providing access to each of the subset of the plurality of application extensions via the extension management interface on the device of the at least one user.

2. The method of claim 1, wherein the access setting for the at least one selected application extension is configured according to a manifest in the central repository.

3. The method of claim 1, wherein the access setting for the at least one selected application extension comprises a mandatory installation for the at least one user.

4. The method of claim 3, further comprising:
receiving a request from the at least one user to disable the at least one selected application extension;
determining that the at least one selected application extension comprises the mandatory installation; and
in response to determining that the at least one selected application extension comprises the mandatory installation, disregarding the request from the at least one user to disable the at least one selected application extension.

5. The method of claim 1, further comprising:
adding a new application extension to the central repository;
determining that the at least one user is configured to receive access to the new application extension; and
in response to determining that the at least one user is configured to receive access to the new application extension, providing an access setting for the new application extension to the at least one user device.

6. The method of claim 1, further comprising:
displaying, to an administrator, a list of at least the subset of the plurality of application extensions enabled for the at least one user.

7. The method of claim 6, further comprising displaying a configuration option for at least one optional application extension for the at least one user.

8. The method of claim 1, further comprising:
receiving a modification to a group membership of the at least one user;
determining whether at least one new application extension is associated with the at least one user's modified group membership; and
instantiating the at least one new application extension on the at least one user device.

9. The method of claim 1, further comprising:
receiving a request from the at least one user to install at least one new application extension;
determining whether the at least one new application extension is available in the central repository; and
in response to determining that the at least one new application extension is available in the central repository, providing an access setting for the at least one new application extension.

10. The method of claim 9, further comprising:
in response to determining that the at least one new application extension is not available in the central repository, transmitting a request for the at least one new application extension to an administrator.

11. The method of claim 1, wherein the extension management interface is provided through an e-mail client application.

12. A system for providing application extension management, the system comprising:

a memory storage; and
a processing unit coupled to the memory storage, wherein the processing unit is configured to:
install, by an extension management application, a plurality of application extensions in a central repository;
provide an extension management interface configured to:
identify a plurality of users associated with the plurality of application extensions;
display a usage status of each of the plurality of users associated with the plurality of application extensions, the usage status identifying one or more of: enabled, disabled, and actively in use;
configure a usage policy for the plurality of application extensions, wherein the usage policy is based at least in part on the usage status of each of the plurality of users, and wherein the usage status indicates whether the at least one application extension is actively in use by at least one of the plurality of users; and
based at least in part on the usage policy and a usage status of the at least one of the plurality of users, receive a selection of at least one application extension of the plurality of application extensions for access by the at least one user;
configure an access setting for the at least one selected application extension for the at least one user;
provide access to the at least one selected application extension on the at least one user device based on the access setting;
identify at least a subset of the plurality of application extensions associated with the at least one user, wherein at least one first extension of the subset of the plurality of application extensions comprises a mandatory access setting and at least one second extension of the subset of the plurality of application extensions comprises an optional access setting; and
provide access to each of the subset of the plurality of application extensions via the extension management interface on the device of the at least one user.

13. The system of claim 12, wherein the at least one selected application extension is selected for the at least one user according to a group membership of the at least one user.

14. The system of claim 12, wherein the access setting to the at least one selected application extension is provided to all users associated with an organization.

15. The system of claim 12, wherein the access setting of the at least one selected application extension is configured as mandatory for the at least one user.

16. The system of claim 12, wherein the extension management interface is provided through an e-mail client application.

17. The system of claim 16, wherein the central repository is associated with an e-mail server and the processing unit is further configured to store a manifest for each of the plurality of application extensions in a mailbox.

18. The system of claim 12, the processing unit further configured to:
add a new application extension to the central repository;
determine whether the at least one user is configured to receive access to the new application extension; and
in response to determining that the at least one user is configured to receive access to the new application extension, providing an access setting for the new application extension to the at least one user device.

19. The system of claim 12, the processing unit further configured to:
- receive a request from the at least one user to install a new application extension;
- determine whether the at least one new application extension is available in the central repository; and
- in response to determining that the new application extension is available from among the plurality of application extensions in the central repository, providing an access setting for the new application extension.

20. A computer-readable storage device which stores a set of instructions which when executed performs a method for providing application extension management, the method executed by the set of instructions comprising:
- providing, by an e-mail application, an extension management interface, wherein the extension management interface displays a plurality of mailboxes each associated with one of a plurality of application extensions;
- configuring an access setting for at least one of the plurality of application extensions for at least one of the following: an individual user, a group of users, and all users associated with an organization;
- storing the access setting for the at least one of the plurality of application extensions in a manifest in one of the plurality of mailboxes associated with the at least one of the plurality of application extensions;
- configuring a usage policy for the plurality of application extensions, wherein the usage policy is based at least in part on a usage status of each of a plurality of users associated with at least one application extension of the plurality of application extensions, and wherein the usage status indicates whether the at least one application extension is actively in use by at least one user of the plurality of users;
- based at least in part on the usage policy and the usage status of the at least one user, receiving a selection of a new application extension of the plurality of application extensions;
- installing the new application extension via the extension management interface, wherein installing the new application extension comprises:
  - creating a new mailbox for the new application extension,
  - configuring an access setting for the new application extension, and
  - storing the access setting for the new application extension in the new mailbox;
- receiving a login request from the at least one user on a remote user device;
- identifying at least a subset of the plurality of application extensions associated with the at least one user, wherein at least one first extension of the subset of the plurality of application extensions comprises a mandatory access setting and at least one second extension of the subset of the plurality of application extensions comprises an optional access setting; and
- providing access to each of the subset of the plurality of application extensions to a remote device of the at least one user.

* * * * *